( 12 ) United States Patent
Kobayashi et al.

(10) Patent No.: US 9,011,019 B2
(45) Date of Patent: Apr. 21, 2015

(54) ROLLER BEARING

(75) Inventors: Yasuhiro Kobayashi, Osaka (JP);
Ryohei Hosaka, Yao (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 14/003,552

(22) PCT Filed: Mar. 16, 2012

(86) PCT No.: PCT/JP2012/056905
§ 371 (c)(1),
(2), (4) Date: Sep. 6, 2013

(87) PCT Pub. No.: WO2012/132971
PCT Pub. Date: Oct. 4, 2012

(65) Prior Publication Data
US 2013/0343689 A1 Dec. 26, 2013

(30) Foreign Application Priority Data

Mar. 25, 2011 (JP) ................... 2011-067840
Mar. 28, 2011 (JP) ................... 2011-069944
Feb. 15, 2012 (JP) ................... 2012-030585

(51) Int. Cl.
*F16C 33/58* (2006.01)
*F16C 33/62* (2006.01)
*F16C 19/26* (2006.01)
(Continued)

(52) U.S. Cl.
CPC ................ *F16C 33/62* (2013.01); *F16C 19/26* (2013.01); *F16C 33/34* (2013.01); *F16C 33/6696* (2013.01); *F16C 19/225* (2013.01);
(Continued)

(58) Field of Classification Search
CPC ........ F16C 19/24; F16C 19/26; F16C 19/225; F16C 33/34; F16C 33/583; F16C 33/585; F16C 33/62; F16C 33/6696; F16C 2206/04
USPC .............. 384/492, 569, 625, 907, 907.1, 912, 384/913
See application file for complete search history.

(56) References Cited

U.S. PATENT DOCUMENTS 5,503,481 A * 4/1996 Hashimoto et al. ........... 384/569
6,764,219 B2 * 7/2004 Doll et al. ..................... 384/565

FOREIGN PATENT DOCUMENTS

JP       A 2002-122152    4/2002
JP       A 2003-156053    5/2003
(Continued)

OTHER PUBLICATIONS

Apr. 17, 2012 Search Report issued in International Patent Application No. PCT/JP2012/056905 (with translation).
Oct. 2, 2013 International Preliminary Report on Patentability issued in International Patent Application No. PCT/JP2012/056905 (with translation).

*Primary Examiner* — James Pilkington
(74) *Attorney, Agent, or Firm* — Oliff PLC

(57) ABSTRACT

A roller bearing capable of effectively improving the service life of the roller bearing is provided by performing surface treatment with coating. A cylindrical roller bearing includes: an outer ring having an outer ring raceway surface; an inner ring having an inner ring raceway surface that faces the outer ring raceway surface; and a plurality of cylindrical rollers rollably disposed between the outer ring raceway surface and the inner ring raceway surface. The inner ring raceway surface of the inner ring is provided with a black oxidation coating, and a rolling contact surface of each cylindrical roller is provided with a diamond-like carbon coating.

2 Claims, 5 Drawing Sheets

(51) Int. Cl.
*F16C 33/34* (2006.01)
*F16C 33/66* (2006.01)
*F16C 19/22* (2006.01)
*C23C 22/60* (2006.01)

(52) U.S. Cl.
CPC .......... *F16C33/585* (2013.01); *F16C 2206/04* (2013.01); *C23C 22/60* (2013.01); *Y10S 384/9071* (2013.01)

(56) References Cited

FOREIGN PATENT DOCUMENTS

| | | |
|---|---|---|
| JP | A 2005-9648 | 1/2005 |
| JP | A 2006-144828 | 6/2006 |
| JP | A 2008-95916 | 4/2008 |
| JP | A 2008-298171 | 12/2008 |

\* cited by examiner

ROLLER BEARING

TECHNICAL FIELD

The invention relates to a roller bearing for use in a wind-powered generator or the like.

BACKGROUND ART

As bearings disposed in, for example, gear boxes for wind-powered generation, medium-size roller bearings are often used. There are some cases where a windmill for use in wind-powered generation is placed in a non-steady operation which is other than a normal power-generating operation and in which rotary torque is not transmitted to a speed increaser, when electric power is cut off due to electricity outage or the like, when a control of reducing the rotary torque is performed due to high wind or the like, etc. In such a case, especially, a roller bearing mounted on a high-speed shaft rotates at a high speed in a nearly non-load state, so that a raceway surface of the bearing is not supplied with sufficient lubricant and therefore smearing (a phenomenon in which a plurality of minute seizures is generated) occurs on a raceway surface of a rotary ring or rolling contact surfaces of rollers, resulting in a reduced service life of the roller bearing.

Therefore, conventionally, in order to protect the raceway surface of the rotary ring and the rolling contact surfaces of the rollers, the raceway surface and the rolling contact surfaces are subjected to a surface treatment with manganese phosphate coating (see, for example, Patent Document 1).

PRIOR ART DOCUMENT

Patent Document

Patent Document 1: Japanese Patent Application Publication No. 2003-156053

BRIEF SUMMARY OF THE INVENTION

However, the manganese phosphate coating is inferior in load bearing, and therefore has a problem that peeling easily occurs on the raceway surface or the rolling contact surfaces so that the service life of the roller bearing cannot be sufficiently improved.

The invention has been made in view of the foregoing circumstances, and it is an object of the invention to provide a roller bearing capable of effectively improving the service life of the roller bearing by performing a surface treatment with coating.

The roller bearing of the invention for achieving the foregoing object is characterized by comprising: a fixed ring having a fixed raceway surface; a rotary ring having a rotary raceway surface that faces the fixed raceway surface; and a plurality of rollers rollably disposed between the fixed raceway surface and the rotary raceway surface, wherein, out of the rotary raceway surface and a rolling contact surface of each of the rollers, one of the surfaces is provided with a black oxidation coating and the other surface is provided with a diamond-like carbon coating.

According to the invention, because one of the rotary raceway surface of the rotary ring and the rolling contact surface of each of the rollers is provided with the black oxidation coating, lubricant can be stored in cracks and holes that are produced when the coating is formed. Therefore, the lubricant can be retained on one of the rotary raceway surface and the rolling contact surface of each of the rollers, so that occurrence of smearing can be effectively restrained.

Furthermore, because the other one of the rotary raceway surface of the rotary ring and the rolling contact surface of each of the rollers is provided with the diamond-like carbon coating, the surface can be hardened. Therefore, occurrence of peeling on the surface provided with the diamond-like carbon coating can effectively be restrained.

Therefore, by performing a surface treatment with coating on the rotary raceway surface of the rotary ring and the rolling contact surface of each of the rollers, the service life of the roller bearing can be effectively improved.

Furthermore, it is preferable that, in one of the fixed ring and the rotary ring, at least one side of the raceway surface in an axial direction be provided with a rib surface that is in sliding contact with an end surface of each of the rollers, and that, out of the rib surface and the end surface of each of the rollers, one of the surfaces be provided with the black oxidation coating and the other surface be provided with the diamond-like carbon coating.

In this case, because one of the rib surface of the rotary ring and the end surface of each of the rollers is provided with black oxidation coating, lubricant can be stored in the cracks and holes that are produced when the coating is formed. Therefore, the lubricant can be retained on one of the rib surface and the end surface, so that occurrence of smearing can be effectively restrained.

Furthermore, because the other one of the rib surface and the end surface is provided with the diamond-like carbon coating, the surface can be hardened. Therefore, occurrence of peeling on the surface provided with the diamond-like carbon coating can effectively be restrained.

Therefore, by performing a surface treatment with coating on the rib surface of the rotary ring and the end surface of each of the rollers, the service life of the roller bearing can be effectively improved.

With the roller bearing according to the invention, it is possible to effectively improve the service life of the roller bearing by performing a surface treatment with coating on a rotary raceway surface of a rotary ring and rolling contact surfaces of rollers.

DETAILED DESCRIPTION OF THE INVENTION

Hereinafter, embodiments of a roller bearing according to the invention will be described in detail with reference to the drawings.

Figure 1:
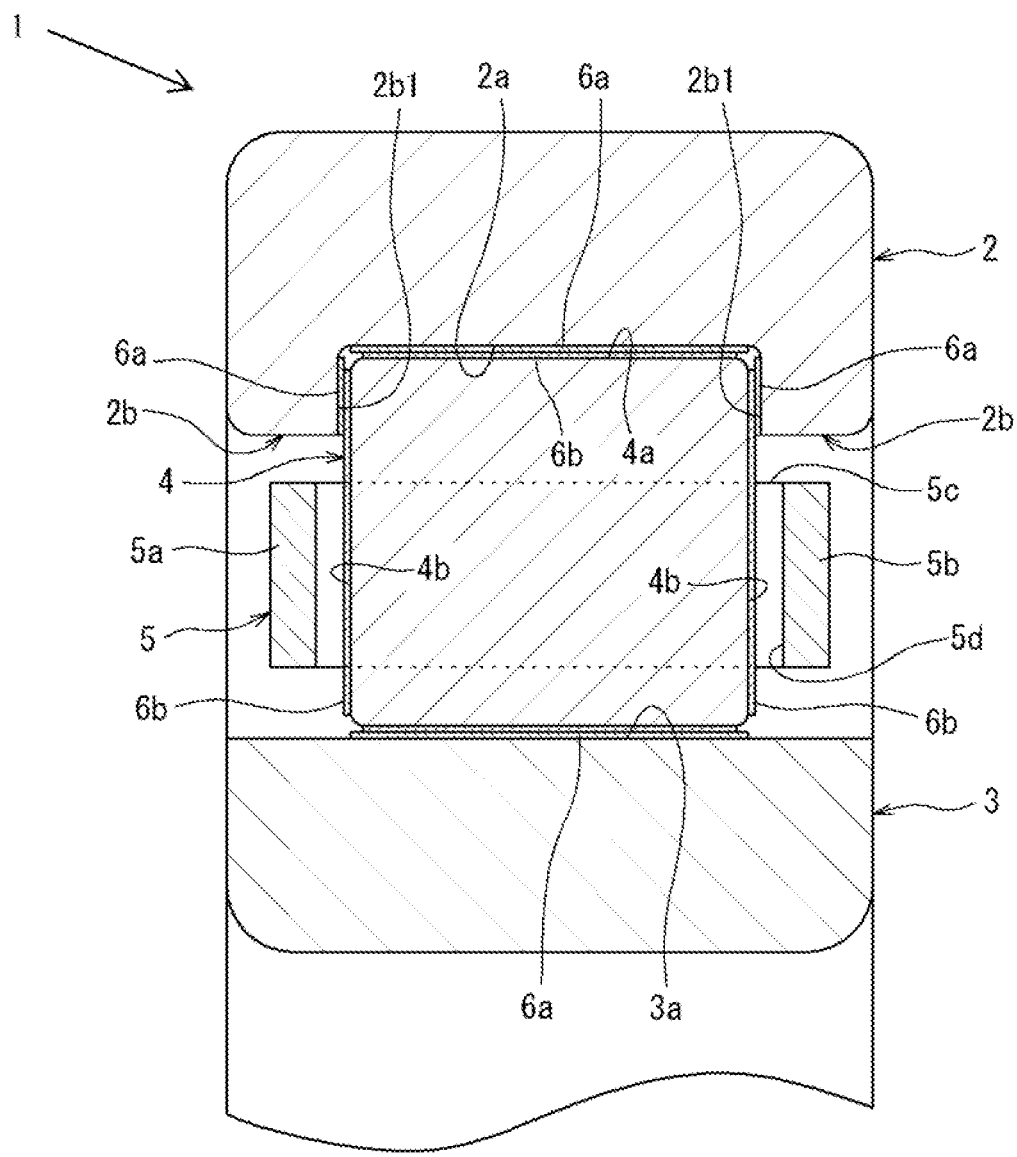
FIG. 1 is a sectional view showing a roller bearing according to a first embodiment of the invention.

FIG. 1 is a sectional view of a roller bearing according to a first embodiment of the invention. The roller bearing according to the present embodiment is a cylindrical roller bearing 1 that bears a radial load in a gearbox for wind-powered generation. The cylindrical roller bearing 1 includes an outer ring 2 as a fixed ring, an inner ring 3 as a rotary ring that is disposed so as to be rotatable coaxially with the outer ring 2, a plurality of cylindrical rollers 4 that are rollably disposed between the outer ring 2 and the inner ring 3, and a cage 5 for holding the cylindrical rollers 4 at predetermined intervals in circumferential direction.

The outer ring 2 has an outer ring raceway surface (fixed raceway surface) 2a that is formed on its inner periphery, and rib portions 2b formed to be protruded radially inward at axially opposite sides of the outer ring raceway surface 2a. Each rib portion 2b has a rib surface 2b1 that is in sliding contact with a corresponding one of end surfaces 4b of each cylindrical roller 4 at the axially opposite sides thereof.

On the outer periphery of the inner ring 3, there is formed an inner ring raceway surface (rotary raceway surface) 3a that faces the outer ring raceway surface 2a of the outer ring 2. The cylindrical rollers 4 are rollably disposed between the outer ring raceway surface 2a and the inner ring raceway surface 3a. An outer peripheral surface of each of the cylindrical rollers 4 is a rolling contact surface 4a that rolls on the outer ring raceway surface 2a and the inner ring raceway surface 3a.

The cage 5 includes a first annular portion 5a and a second annular portion 5b that are disposed apart from each other in the axial direction, and a plurality of pillar portions 5c that are disposed at equal intervals in the circumferential direction of the two annular portions 5a, 5b and that connect the two annular portions 5a, 5b. Pockets 5d are formed between the two annular portions 5a, 5b and the adjacent pillar portions 5c. The cylindrical rollers 4 are disposed in these pockets 5d. The cage 5 retains, in the plurality of pockets 5d, the plurality of cylindrical rollers 4 at predetermined intervals in the circumferential direction.

Figure 2:
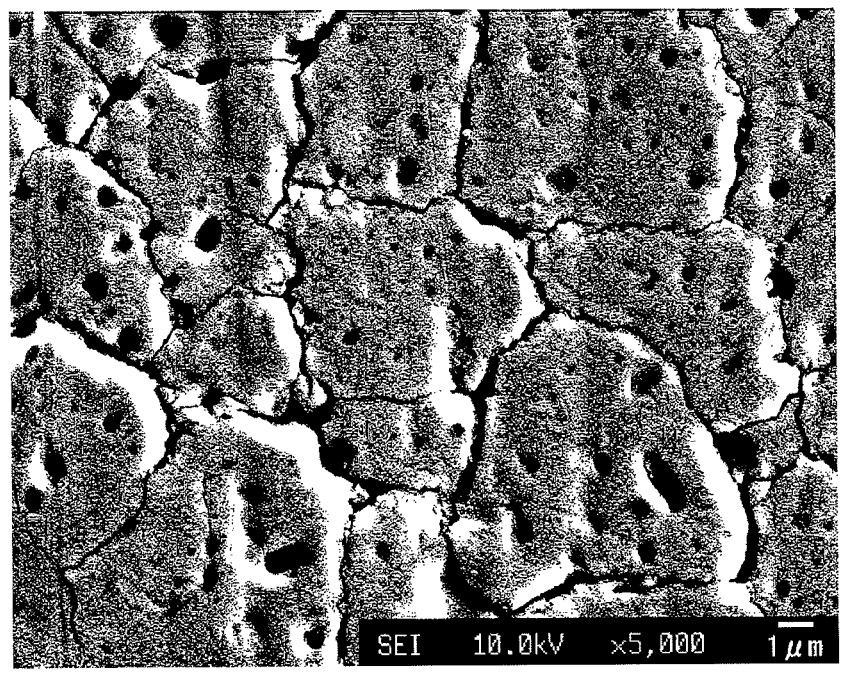
FIG. 2 is a drawing-substituting photograph taken under an electron microscope, showing a surface of a black oxidation coating.

The outer ring raceway surface 2a of the outer ring 2, the inner ring raceway surface 3a of the inner ring 3 and the rolling contact surface 4a of each of the cylindrical rollers 4 are surface-treated with respectively different coatings. Specifically, on each of the outer ring raceway surface 2a and the inner ring raceway surface 3a, there is formed a black oxidation coating 6a that extends over the entire circumference of the raceway surface. FIG. 2 is a drawing-substituting photograph taken under an electron microscope, showing a surface of the black oxidation coating 6a. The black oxidation coating 6a has a characteristic that when the coating is formed, a plurality of cracks and holes are produced in a surface of the coating as shown in FIG. 2. Therefore, lubricant supplied onto the black oxidation coating 6a can be stored in the cracks and the holes.

On the rolling contact surface 4a of each cylindrical roller 4, there is formed a diamond-like carbon (DLC) coating 6b that contains, for example, tungsten carbide carbon (WCC) and that extends over the entire circumference of the roller. The film thickness of each black oxidation coating 6a and each diamond-like carbon coating 6b is set equal to or less than 3 μm.

Each of the rib surfaces 2b1 of the outer ring 2 and each of the end surfaces 4b of each cylindrical roller 4 are surface-treated with respectively different coatings. Specifically, the black oxidation coating 6a is formed entirely over each rib surface 2b1. Furthermore, the diamond-like carbon (DLC) coating 6b that contains, for example, tungsten carbide carbon (WCC) is formed entirely over each end surface 4b. The film thickness of each of the black oxidation coatings 6a and the diamond-like carbon coatings 6b is also set equal to or less than 3 μm.

Figure 3:
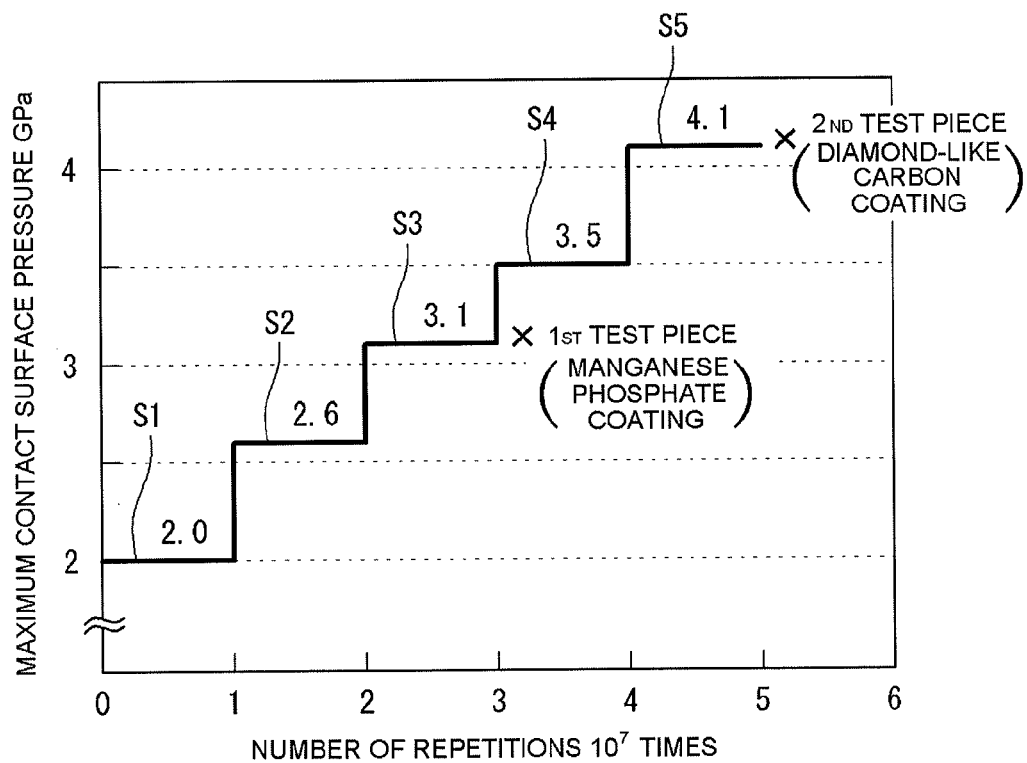
FIG. 3 is a graph showing results of an endurance test of coatings.

FIG. 3 is a graph showing results of an endurance test that was conducted until occurrence of peeling of the manganese phosphate coating and the diamond-like carbon coating.

Conditions of this endurance test are as follows. A first test piece is a test piece in which a manganese phosphate coating is formed on a flat-plate test piece made of JIS SUJ2. Furthermore, a second test piece is a test piece in which a diamond-like carbon coating is formed on a flat-plate test piece made of JIS SUJ2.

A method of the endurance test performed until peeling occurred on the manganese phosphate coating of the first test piece will be shown below.

Figure 4:
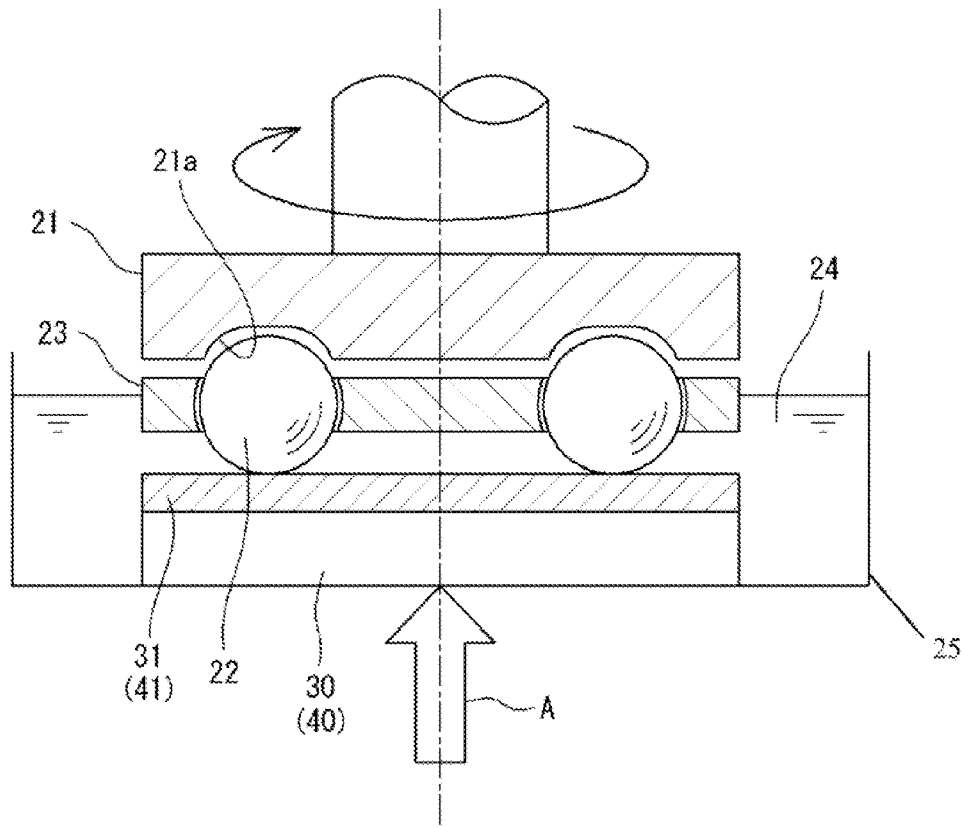
FIG. 4 is a schematic diagram showing a testing device for the aforementioned endurance test.

FIG. 4 is a schematic diagram of a testing device for the endurance test. This testing device includes an inner ring 21 for an axial bearing which is made of JIS SUJ2 and which has an annular raceway 21a, six balls 22 of ⅜ inch made of JIS SUJ2, an annular cage 23 that holds each of the balls 22, lubricating oil 24, and a container 25 in which the first test piece 30 is disposed and the lubricating oil 24 is stored. The annular raceway's diameter (the diameter of a groove bottom of the raceway 21a, P.C.D.) is ϕ38 mm.

The first test piece 30 was placed in the container 25 so that the manganese phosphate coating 31 faced upward in the vertical direction, and the six balls 22 held by the cage 23 were placed on the manganese phosphate coating 31, and the inner ring 21 was put on the six balls 22 so that the balls 22 were placed within the raceway 21a. The lubricating oil 24 was put into the container 25 so that the first test piece 30 was completely submerged and the cage 23 was immersed up to its substantially middle position in the vertical direction. As the lubricating oil 24, MEROPA WM320 in trade name (produced by Chevron) was used. Axial load in the direction of an arrow A shown in the drawing was applied between the first test piece 30 and the inner ring 21 so that the contact surface pressure between the balls 22 and the first test piece 30 became equal to a predetermined value, and then the first test piece 30 was immobilized and the inner ring 21 was rotated at a rotation speed of 1200 min$^{-1}$. The passage speed of the balls 22 at this time was 3600 min$^{-1}$.

In the endurance test, as shown in FIG. 3, the contact surface pressure was intermittently raised so as to be 2.0 GPa at step S1, 2.6 GPa at step S2, 3.1 GPa at step S3, 3.5 GPa at step S4, and 4.1 GPa at step S5. At steps S1 to S5, the inner ring 21 was rotated 1×10$^7$ times.

A method of the endurance test performed until peeling occurred on the diamond-like carbon coating of the second test piece will be shown below.

As shown in FIG. 4, in the testing device used for the endurance test performed until peeling occurred on the manganese phosphate coating 31 mentioned above, the test was conducted by using the second test piece 40 instead of the first test piece 30 as a test piece. That is, the second test piece 40 was placed in the container 25 so that the diamond-like carbon coating 41 (corresponding to the diamond-like carbon coating 6b according to the invention) faced upward in the vertical direction, and the six balls 22 held by the cage 23 were placed on the diamond-like carbon coating 41, and then a test similar to the test of the first test piece 30 was conducted.

In FIG. 3, with regard to the manganese phosphate coating, peeling occurred when the contact surface pressure was 3.1 GPa, whereas, with regard to the diamond-like carbon coating, peeling occurred when the contact surface pressure was 4.1 GPa. From results of this test, it can be understood that the diamond-like carbon coating is more excellent in load bearing than the manganese phosphate coating.

Figure 5:
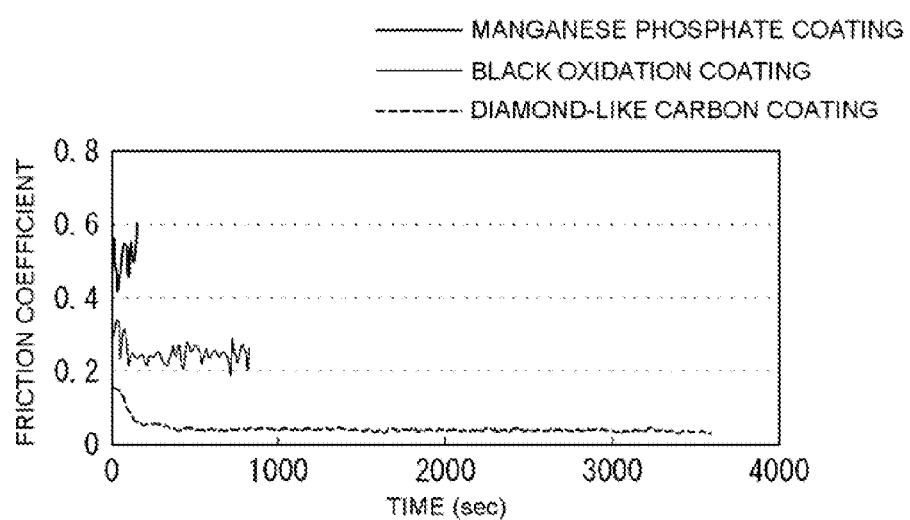
FIG. 5 is a graph showing transitions in friction coefficients of coatings under a non-lubricated condition.

FIG. 5 is a graph showing transitions in friction coefficients of the manganese phosphate coating, the diamond-like carbon coating and the black oxidation coating under a non-lubricated condition.

A measurement method for the friction coefficient is as follows. A third test piece is a test piece in which a manganese phosphate coating is formed on a flat-plate test piece made of JIS SUJ2. Furthermore, a fourth test piece is a test piece in which a diamond-like carbon coating is formed on a flat-plate test piece made of JIS SUJ2. A fifth test piece, is a test piece in which a black oxidation coating is formed on a flat-plate test piece made of JIS SUJ2.

A measurement method for transitions in the friction coefficient of the manganese phosphate coating of the third test piece will next be shown.

Figure 6:
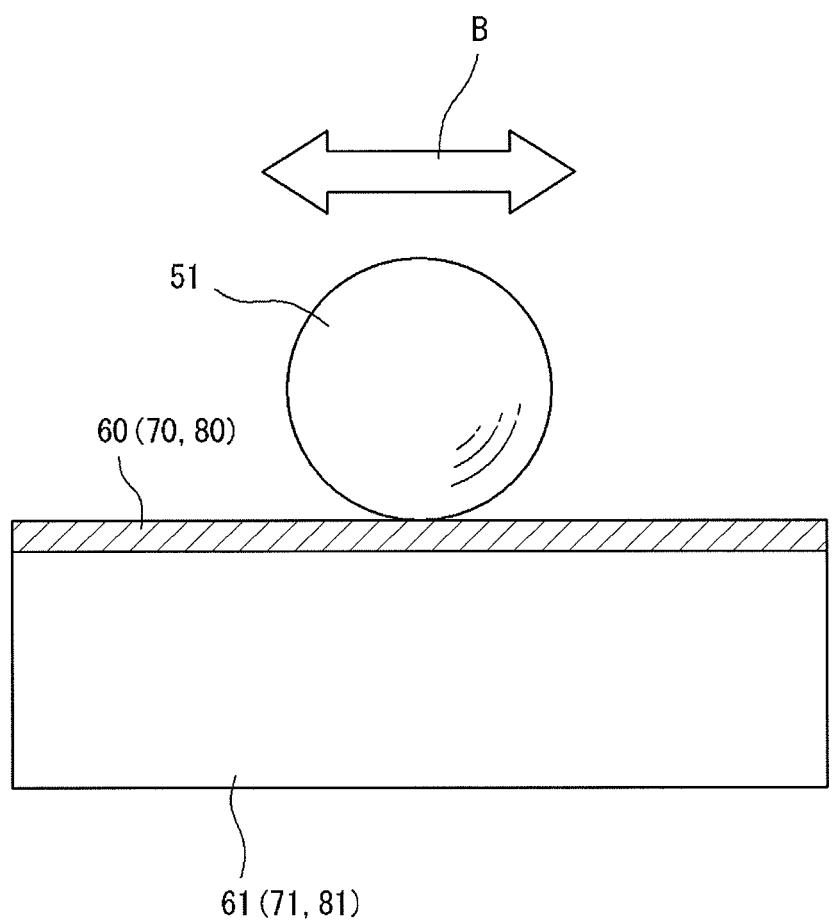
FIG. 6 is a schematic diagram showing a measuring device for measuring transitions in the friction coefficients.

FIG. 6 is a schematic diagram showing a measuring device for measuring transitions in the friction coefficient. In this measuring device, balls 51 of 3/16 inch made of JIS SUJ2 and lubricating oil (not shown) were prepared.

A third test piece 60 was disposed so that a manganese phosphate coating 61 faced upward in the vertical direction, and the balls 51 fixed so as not to roll were placed on the manganese phosphate coating 61. Lubricating oil was applied to surface of the third test piece 60. As the lubricating oil, MEROPA WM320 in trade name (produced by Chevron) was used. An axial load of 10 N was applied between the third test piece 60 and the balls 51 so that the contact surface pressure became equal to 1.6 GPa. In this state, the balls 51 were moved relative to the third test piece 60 over a distance of 10 mm at an average linear speed of 40 mm/s. This relative movement was continued as reciprocating movement shown by arrows B in the drawing for 3600 s.

A measurement method for transitions in the friction coefficient of the diamond-like carbon coating of the fourth test piece will next be shown.

As shown in FIG. 6, in the measuring device used in the measurement method for transitions in the friction coefficient of the manganese phosphate coating 61 described above, a test was conducted by using the fourth test piece 70 instead of the third test piece 60 as a test piece. That is, the fourth test piece 70 was placed so that the diamond-like carbon coating 71 (corresponding to the diamond-like carbon coating 6b according to the invention) was in contact with the balls 51, and then measurement similar to the measurement on the third test piece 60 was conducted.

A measurement method for transitions in the friction coefficient of the black oxidation coating of the fifth test piece will next be shown.

As shown in FIG. 6, in the measuring device used in the measurement method for transitions in the friction coefficient of the manganese phosphate coating 61 described above, a test was conducted by using the fifth test piece 80 instead of the third test piece 60 as a test piece. That is, the fifth test piece 80 was placed so that a black oxidation coating 81 (corresponding to the black oxidation coating 6a in the invention) was in contact with the balls 51, and then measurement similar to the measurement on the third test piece 60 was conducted.

In FIG. 5, the friction coefficient of the manganese phosphate coating transitions in the range of 0.4 to 0.6, whereas the friction coefficient of the diamond-like carbon coating transitions below or at 0.2. From this result, it can be understood that the manganese phosphate coating is greater in friction coefficient than the diamond-like carbon coating. Further, the friction coefficient of the black oxidation coating transitions in the range of 0.2 to 0.4. From this result, it can be understood that the friction coefficient of the black oxidation coating is smaller than the friction coefficient of the manganese phosphate coating, but larger than the friction coefficient of the diamond-like carbon coating.

As described above, with the cylindrical roller bearing 1 according to the embodiment of the invention, because the black oxidation coating 6a is formed on the inner ring raceway surface 3a of the inner ring 3, which is a rotary ring, lubricant can be stored in the cracks and holes that are produced when the coating 6a is formed. Therefore, lubricant can be retained on the inner ring raceway surface 3a, so that occurrence of smearing can be effectively restrained.

Furthermore, because the diamond-like carbon coating 6b, which is excellent in load bearing, is formed on the rolling contact surface 4a of each cylindrical roller 4, the surface thereof can be hardened. Thus, occurrence of peeling on the rolling contact surfaces 4a can be effectively restrained.

Furthermore, when the lubricating oil that is present at a region of contact between the black oxidation coating 6a and the diamond-like carbon coating 6b decreases, and, further, if the amount of the lubricant retained in the cracks and holes produced in the black oxidation coating 6a becomes null, the friction force of the black oxidation coating 6a, of which the friction coefficient is greater than the friction coefficient of the diamond-like carbon coating 6b, makes it possible to efficiently transmit the rotary drive force of the inner ring 3 to the cylindrical rollers 4.

Therefore, by performing a surface treatment with coating on the inner ring raceway surface 3a of the inner ring 3 and the rolling contact surface 4a of each cylindrical roller 4, the service life of the cylindrical roller bearing 1 can be effectively improved.

Furthermore, because the black oxidation coating 6a is formed on each rib surface 2b 1 of the outer ring 2, the lubricant can be stored in the cracks and holes that are produced when the coating 6a is formed. Because the lubricant can be retained on the rib surface 2b1 as described above, occurrence of smearing can be effectively restrained.

Furthermore, because the diamond-like carbon coating 6b is formed on the end surfaces 4a of each cylindrical roller 4, the surfaces thereof can be hardened. Thus, occurrence of peeling on the end surface 4b can be effectively restrained.

Therefore, by performing the surface treatment with coating on the rib surfaces 2b1 of the outer ring 2 and the end surfaces 4b of each cylindrical roller 4, the service life of the cylindrical roller bearing 1 can be effectively improved.

Figure 7:
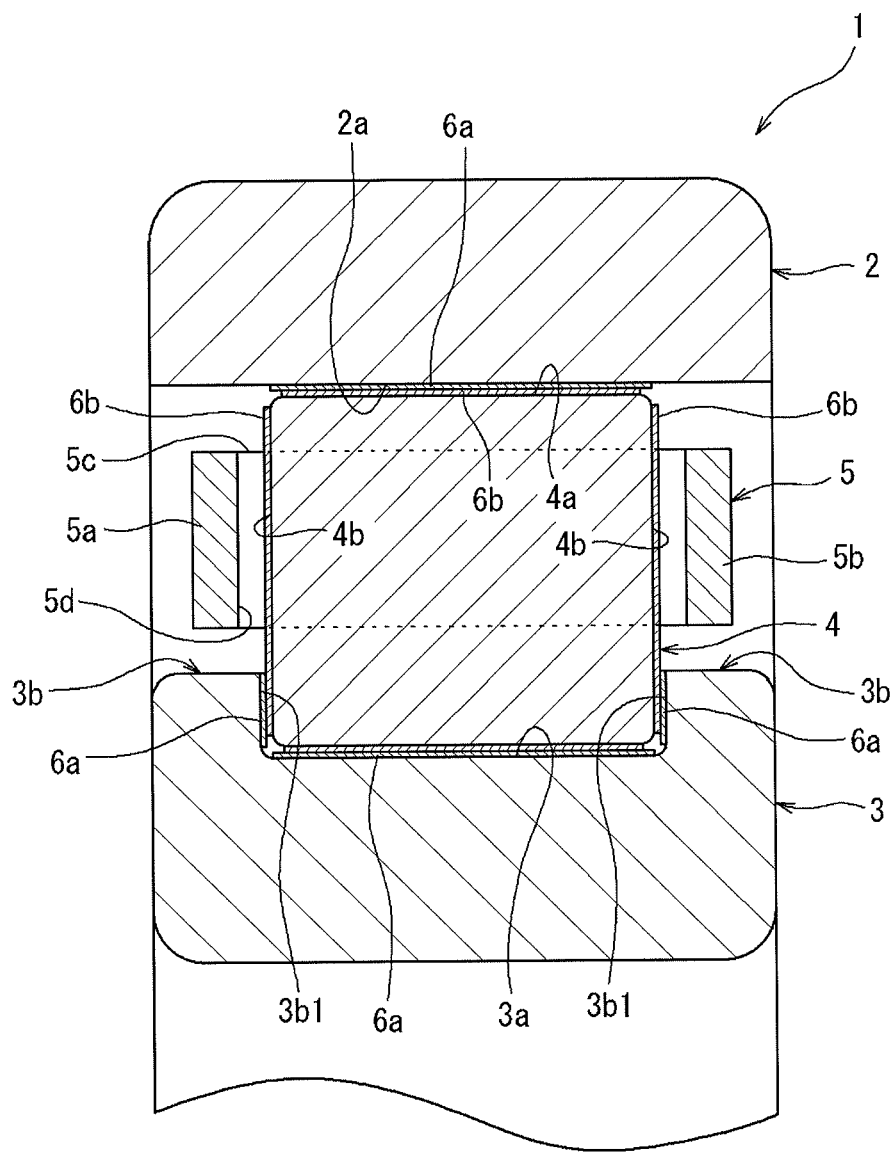
FIG. 7 is a sectional view showing a roller bearing according to a second embodiment of the invention.

FIG. 7 is a sectional view showing a roller bearing according to a second embodiment of the invention. A difference of the present embodiment from the first embodiment is that rib surfaces are formed on an inner ring.

In the present embodiment, an outer periphery of an inner ring 3 has rib portions 3b that are protruded radially outward at two axially opposite sides of an inner ring raceway surface 3a. Each rib portion 3b has a rib surface 3b1 that is in sliding contact with a corresponding one of the end surfaces 4b of each cylindrical roller 4.

The rib surfaces 3b1 of the inner ring 3 and the end surfaces 4b of each cylindrical roller 4 are surface-treated with respectively different coatings. Specifically, a black oxidation coating 6a is formed entirely over each rib surface 3b1. Furthermore, a diamond-like carbon (DLC) coating 6b that contains, for example, tungsten carbide carbon (WCC) is formed entirely over each end surface 4b. The film thickness of each of the black oxidation coatings 6a and the diamond-like carbon coatings 6b is set equal to or less than 3 µm.

Similarly to the embodiment of the invention described above, because the inner ring raceway surface 3a of the inner ring 3 and the rolling contact surface 4a of each cylindrical roller 4 are surface-treated with the black oxidation coating 6a and the diamond-like carbon coating 6b, respectively, the service life of the cylindrical roller bearing 1 can be effectively improved.

Furthermore, because each rib surface 3b1 of the inner ring 3 and the end surfaces 4b of each cylindrical roller 4 are surface-treated with the black oxidation coating 6a and the diamond-like carbon coating 6b, respectively, the service life of the cylindrical roller bearing 1 can be further improved.

Note that, the invention may be carried out with changes as appropriate, without being limited to the foregoing embodiments For example, although in the foregoing embodiments, the black oxidation coating is formed on each of the outer ring raceway surface and the inner ring raceway surface and the diamond-like carbon coating is formed on each of the rolling contact surfaces of the cylindrical rollers, the diamond-like carbon coating may be formed on each of the outer ring raceway surface and the inner ring raceway surface and the black oxidation coating may be formed on each of the rolling contact surfaces of the cylindrical rollers.

Furthermore, although in the foregoing embodiments, coating is formed on each of the outer ring raceway surface and the inner ring raceway surface, it is only necessary to form coating at least on an inner ring raceway surface of a rotary ring.

Furthermore, although in each of the foregoing embodiments, the black oxidation coating is formed on each rib surface and the diamond-like carbon coating is formed on each of the end surfaces of the cylindrical rollers, the diamond-like carbon coating may be formed on each rib surface and the black oxidation coating may be formed on each of the end surfaces of the cylindrical rollers.

Furthermore although in the second embodiment, the diamond-like carbon coating is formed on each of the rolling contact surfaces and the end surfaces of the cylindrical rollers, the diamond-like carbon coating on the rolling contact surface of each cylindrical roller may be continuous with the diamond-like carbon coatings on the end surfaces of the cylindrical roller. Furthermore, a black oxidation coating may be formed on each of the rolling contact surfaces and the end surfaces of the cylindrical rollers. In this case, the black oxidation coating on the rolling contact surface of each cylindrical roller may be continuous with the black oxidation coatings on the end surfaces of the cylindrical roller.

Furthermore, although in the second embodiment, the black oxidation coating is formed on each of the inner ring raceway surface and the rib surfaces of the inner ring, the black oxidation coating on the inner ring raceway surface of the inner ring may be continuous with the black oxidation coating on each of the rib surfaces of the inner ring. Furthermore, a diamond-like carbon coating may be formed on the inner ring raceway surface and each of the rib surfaces of the inner ring. In this case, the diamond-like carbon coating on the inner ring raceway surface of the inner ring may be continuous with the diamond-like carbon coating on each of the rib surfaces of the inner ring.

Furthermore, out of the diamond-like carbon coating and the black oxidation coating, one of the coatings may be formed on each of the inner ring raceway surface of the inner ring and the end surfaces of the cylindrical rollers, and the other coating may be formed on each of the rib surfaces of the inner ring and the rolling contact surfaces of the cylindrical rollers.

Furthermore, although in each of the foregoing embodiments, coating is formed over the entire end surfaces of each cylindrical roller, it is only necessary to form coating on at least a portion that is in sliding contact with a corresponding one of the rib surfaces.

Furthermore, although in each of the cylindrical roller bearings of the foregoing embodiments, the fixed ring is the outer ring and the rotary ring is the inner ring, the fixed ring may be the inner ring and the rotary ring may be the outer ring.

Furthermore, the roller bearing is not limited to radial cylindrical roller bearings, but may also be thrust roller bearings or tapered roller bearings.

The invention claimed is:

1. A roller bearing, comprising:
a fixed ring having a fixed raceway surface;
a rotary ring having a rotary raceway surface that faces the fixed raceway surface; and
a plurality of rollers rollably disposed between the fixed raceway surface and the rotary raceway surface,
wherein, out of the rotary raceway surface and a rolling contact surface of each of the rollers, one of the surfaces is provided with a black oxidation coating and the other surface is provided with a diamond-like carbon coating, wherein a friction coefficient of the black oxidation coating is larger than the friction coefficient of the diamond-like carbon coating.

2. The roller bearing according to claim 1, wherein:
in one of the fixed ring and the rotary ring, a rib surface that is in sliding contact with an end surface of each of the rollers is provided on at least one side of the raceway surface in an axial direction; and
out of the rib surface and the end surface of each of the rollers, one of the surfaces is provided with the black oxidation coating and the other surface is provided with the diamond-like carbon coating.

* * * * *